United States Patent [19]
Onosaka et al.

[11] Patent Number: 5,961,608
[45] Date of Patent: Oct. 5, 1999

[54] MODEM AND COMMUNICATIONS CONTROL SELECTION

[75] Inventors: Kazunobu Onosaka, Santa Clara; Clayton R. Karmel, San Jose, both of Calif.; Masafumi Kuboyama, Kanagawa, Japan; Kazuto Mugura, Cupertino, Calif.

[73] Assignees: Sony Corporation, Tokyo, Japan; Sony Electronics, Inc., Park Ridge, N.J.

[21] Appl. No.: 08/726,132

[22] Filed: Oct. 4, 1996

[51] Int. Cl.⁶ .............................. G06F 13/33; G06F 15/17
[52] U.S. Cl. .............................. 709/249; 709/228; 710/11
[58] Field of Search ................... 395/200.79; 375/222; 379/93.32, 93.34; 370/17; 455/553, 552, 556, 557, 558, 575; 709/249, 228; 710/11

[56] References Cited

U.S. PATENT DOCUMENTS

| | | | |
|---|---|---|---|
| 4,894,859 | 1/1990 | Sou et al. | 379/204 |
| 5,119,504 | 6/1992 | Durboraw, III | 455/556 |
| 5,210,530 | 5/1993 | Kammerer et al. | 340/825.08 |
| 5,479,480 | 12/1995 | Scott | 455/425 |
| 5,483,589 | 1/1996 | Ishida et al. | 379/220 |
| 5,546,379 | 8/1996 | Thaweethai et al. | 370/254 |
| 5,577,105 | 11/1996 | Baum et al. | 379/93.05 |
| 5,631,897 | 5/1997 | Pacheco et al. | 370/237 |
| 5,726,764 | 3/1998 | Averbuch et al. | 455/557 |
| 5,758,293 | 5/1998 | Frasier | 455/556 |

*Primary Examiner*—Mark H. Rinehart
*Attorney, Agent, or Firm*—Blakely, Sokoloff, Taylor & Zafman LLP

[57] ABSTRACT

A simple, flexible and easy-to-use user interface and control mechanism for remote communication supports multiple modems or phone lines being connected and disconnected from a computing or "info-tainment" apparatus. This facilitates remote communications on different types of communications lines and from different locations. The user selects among modems, phone lines or other communication devices by simply physically connecting or disconnecting them from the computer, which is automatically detected. The default response is to select the newly connected modem or line as the currently active communication device, or to activate any other currently connected communication device when the active device is disconnected. A modem and location selection menu pops up giving the user a chance either to confirm or alter this selection. Application software uses an operating system interface to access a communication network via the selected device, which allows the modem selection to apply to all applications software. Also, a communication device's parameters are set up based on the user selecting a "location" parameter, whose value indicates an area within which the apparatus is coupled to the communication network. The modem initialization string, access prefix, account code, phone number to dial and/or whether an area code is dialed can be altered based on how the user sets up the current location—the location "cellular" can select a modem initialization string for an appropriate baud-rate range and protocol and can alter the access number of the communication service provider to dial into cellular-capable modems.

3 Claims, 15 Drawing Sheets

```
Class SystemModem:
    inherits....,
    field...., operation Open();
    operation Close();
    operation Read();
    operation Write();
    operation Disconnect();
    operation ConnectToNumber(number.String):UnsignedShort;
    operation Abort();
End Class;
```

```
24000000 0101 0202 0101 0000 1717 0202 6161 1818  |::::::::::aa::|
24000010 1515 3434 0404 0101 4141 5454 2626 5454  |::44::::AATT&&TT|
24000020 2020 5050 6161 7272 6161 6464 7979 6E6E  |  PParraaddyynn|
24000030 6565 0000 4848 6565 6565 7070 4949 6E6E  |ee::KKeeeepp11nn|
24000040 5454 6F6F 7575 6363 6868 2020 4343 6161  |TToouucchh  CCoo|
24000050 7272 6464 0000 3333 3737 3636 3131 2020  |rrdd::337766 11aa|
24000060 2020 2020 0000 4343 3030 3131 2E2E 3636  |    ::CC0011..66|
24000070 3939 2E2E 3333 3030 0000 FFFF 2020 0404  |99..3300::::  `` |
24000080 FFFF FFFF 0000 0101 2121 0202 0202 0101  |::::::::!!::::::|
24000090 2222 0404 0000 0202 0F0F 7F7F 2222 0909  |""::::::::::""::|
240000A0 0101 1F1F 2828 7070 0505 0000 7070 0000  |::::((pp::::pp::|
240000B0 0000 2222 0000 0202 0000 0606 8F8F 0101  |::""::::::::::::|
240000C0 0303 0303 1F1F 0707 0000 0000 8585 2222  |::::::::::::::""|
240000D0 0808 1313 0000 0606 0707 0000 2222 0000  |::::::::::::""::|
240000E0 8585 1A1A 0505 0101 2323 E0E0 0707 0707  |::::::::""::::::|
240000F0 1818 2424 E0E0 0101 9E9E 7F7F 5555 C5C5  |::$$::::::::UU::|
24000100 4848 0505 1919 8686 5050 8686 5050 2626  |KK::::::PP::PP&&|
24000110 3434 3737 8E8E 7070 8686 0E0E 8686 1A1A  |4477::}}::::::::|
24000120 3535 3535 E8E8 1414 5F5F A3A3 6060 F8F8  |5555::::__::'::::|
24000130 0303 0707 3030 8C8C 8686 6868 1818 0707  |::::00::::hh::::|
24000140 2121 0808 A3A3 6060 F8F8 0202 0707 1818  |!!::::::''::::::|
24000150 0707 2222 0808 A3A3 6060 E8E8 0303 0707  |::""::::''::::::|
24000160 1818 0707 2323 0808 A3A3 6060 E8E8 0202  |::::""::::''::::|
```

21  Function 10  
  02  Size of function 10 tuple  
  02  Cord Function code = Serial Port  
  01  System init information 1A  Configuration Tuple  
  05  Size  
  01  Config register base address field length = 2 byte  
       Config reg exist mask field length = 1 byte  
       Reserved area length = 0 byte  
  23  
  E0 07  Config register base address = $07E0  
  07  Config register 0,1,2 exist 18  Config entry tuple  
  24  Size  
  E0  Config table index

FIG. 20

MODEM AND COMMUNICATIONS CONTROL SELECTION

FIELD OF THE INVENTION

The present invention relates generally to user interfaces and control techniques for remote communications from an interactive apparatus, particularly to modem communications from a portable digital computer system.

BACKGROUND OF THE INVENTION

Modern digital computer systems often use modulator/de-modulator (modem) devices to communicate remotely over telephone lines and other switchable or dial-up channels. As personal computers and modems become less expensive, more and more personal computers in general, and portable computers in particular, include modem devices. Modem use also increases as the use of remote communication services via computer, such as electronic mail, the Internet and on-line services becomes more prevalent. With more computers including modems, it becomes more important that they become easier to use.

In addition to computers, "info-tainment" devices are being designed that rely on remote communications services to provide the user with desired information such as stock quotes or news, or with desired entertainment such as games that are down-loaded to the device from a server or that are played interactively by multiple remote players.

At the same time, the range of available communication lines is increasing. For regular land-line connections on the Public Switched Telephone Network (PSTN), the currently prevalent standards are V.32bis or V.34. For cellular phone communication lines, the protocols MNP10, ETC. or TX-CEL are being used. Thus, to access different communications lines, a single modem may require switching between multiple communication lines and protocols, or a single computing or info-tainment apparatus may require switching between multiple modems. Such line and modem switching should be easy and should not involve the user in the computer system's implementation details.

At the same time, portable computing and info-tainment apparatuses are becoming more prevalent. Particularly in the case of a portable apparatus, it is desirable to have both a standard modem device for land-line telephone communication, as well as a cellular-capable modem device for communication while traveling, or while at remote sites. Typically, the cellular-capable modem would be removable from the portable computing device, due to its size and weight. In such a situation, it is desirable that the user not be required to undertake a complex series of actions on his portable apparatus to switch which modem is currently being used.

Further, a typical computing or info-tainment apparatus includes a wide variety of different application programs that require communication services, including but limited to: electronic mail, Internet browsing, news, stock quotes, and on-line financial services. Each application program may have a different set of commands or set-up tables by which the user specifies the current modem and the sequence of numbers to dial to establish communications. Each application program may keep its own "phone book" of frequently dialed numbers, and its own set of current modem selection and control parameters. It is not uncommon that these essential parameters are expressed in terms of the low-level details that implement the modem's interface to the computing system, such as COM ports and modem initialization strings. The user of a prior-art computing device may be expected to operate these various user interfaces as needed to accommodate different modems, different communications lines, and calls originating from different locations.

Further, in order to access a communication service, the modem may have to dial a prefix to get an outside line, dial an account code or phone card number, or dial an area code. If the user takes his portable computing device to a new area code, or if he plugs his modem into a line that requires a different prefix to access an outside line, then the modem is likely to dial incorrectly, unless the user explicitly changes the area code and access prefix values. This may have to be done for every entry in the various telephone books that he is going to use at this location. Further, as he changes locations, these changes to his telephone book entries may have to be repeatedly undone and redone.

SUMMARY OF THE INVENTION

Thus, objects of the present invention include providing a simple, flexible and easy-to-use user interface and control mechanism for remote communication that supports multiple modems being connected to and disconnected from an interactive apparatus, that can be used on different types of communications lines and that can be used from different locations.

These and other objectives are met by the present invention, in which the user of an apparatus can select among communication devices by simply physically connecting or disconnecting the communication device from the apparatus. The invention automatically detects the device being connected, and in response selects the newly connected modem or line as the selected or currently active communication device. When the invention detects the currently active communication device being disconnected from the portable computer, then it is automatically deselected and another device, if one is connected, is selected.

In some embodiments, a modem selection menu pops up in response to a communication device being connected, which automatically shows the newly connected modem or line as the currently active communication device, but which facilitates the user either altering this automatic selection or simply confirming it. Similarly in response to the currently active device being disconnected, the user can confirm or alter the automatic selection of a different modem or line, via a menu that automatically pops up.

The present invention is designed to be used in conjunction with application software that uses an operating system interface to access a communication network via the selected device. Thus, the modem selection according to the present invention applies to all applications software that uses this operating system interface.

The present invention is applicable to a variety of apparatuses including but not limited to: portable computers, desk-top computers, and portable or desk-top "info-tainment" devices. A variety of communication devices may be used, including but not limited to: an external modem, a removable card modem or a phone line that couples a network to a modem internal to the apparatus.

The network used may be a regular phone line or a variety of networks that provide switched or dial-up access, including but not limited to: a cellular telephone connection, a private telephone network, an integrated systems digital network (ISDN), an adaptive differential subscriber line (ADSL), a frame relay network, an asynchronous transfer mode (ATM) network, a personal communications services (PCS) network, or a satellite-based communication line including but not limited to an IRIDIUM network or a TELEDESIC network.

The present invention further operates to set up a communication device based on the user selecting a current value for a location parameter. The current value of the location parameter indicates an area within which the apparatus may be coupled to a communication network. The appropriate communication initialization command, including but not limited to a modem initialization string, is selected based on the current location value. Also, access prefixes, accounting codes or charge numbers, the phone number to dial and whether or not an area code is dialed can be selected based on the location parameter.

For example, a location parameter value of "cellular" can be defined by the user to select a modem initialization string that selects a baud-rate range and protocol appropriate for cellular communications and to alter the access number of the communication service provider to dial into their modems that support cellular protocols.

BRIEF DESCRIPTION OF THE DRAWINGS

The present invention is illustrated in the following drawings, in which known circuits are shown in block-diagram form for clarity. These drawings are for explanation and for aiding the reader's understanding. The present invention should not be taken as being limited to the embodiments and design alternatives illustrated.

FIG. 20 shows the encoded information used to recognize a modem card according to the present invention.

DETAILED DESCRIPTION

Figure 1:
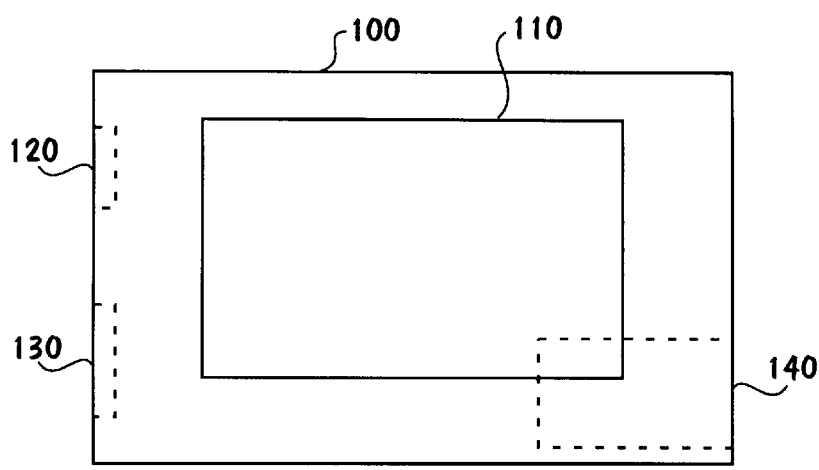
FIG. 1 shows a front view of a small, portable computing device within which the present invention operates.

Disclosed herein are various alternative embodiments and design alternatives of the present invention which, however, should not be taken as being limited to the embodiments and alternatives described. One skilled in the art will recognize alternative embodiments and various changes in form and detail that may be employed while practicing the present invention without departing from its principles, spirit or scope.

Overview

The present invention provides an operating system or system software which switches between a modem driver for a modem on a removable card, for an internal modem, or for an external modem based on selecting the current modem. This selection is made by simple user actions within an intuitive and easy to use metaphor. Based on the user's actions, the system software dynamically changes the pointers to the currently selected modem driver and/or the currently selected serial driver.

A data structure, the modem profile, includes two lists: 1) a supported modem list, which contains the profile for each supported modem; and 2) an available modem list, which contains the profiles for the modems that are available or connected to the computing device at the current time. Many modems can be available on the supported modem list without changing the modem driver.

A modem menu allows the user to select as currently active one of the modems from the available modem list. In one embodiment, only one modem and communication path can be active at a time, thus not more than one communication device is selected at a time. In an alternative embodiment, multiple modems or communication paths can be selected as being currently active, as could be used to relay information from one remote location to another, or to simultaneously, via multitasking, use two different application programs that access different remote communication channels or servers.

Often no extra steps, or only a quick confirmation step, is required on the part of the user to set up the proper modem when the user connects or disconnects a communication device. When the user inserts a modem card into his apparatus, the system hardware detects this card insertion, and signals the operating system, which recognizes the modem card, adds the name of the modem to the available modem list and thus to the modem menu, and automatically selects the newly inserted card modem as the currently active modem.

Similarly, when the user removes a modem card from his apparatus, the software detects the card removal, removes the name of the modem from the available modem menu, and if necessary and possible, automatically selects an alternative modem as the currently active communication device. The alternative selection is necessary if the disconnected modem was selected. The alternative selection is possible if another modem is connected.

When the user connects a phone line to a jack on his apparatus, the system detects this new connection and automatically selects the internal modem that uses the jack. Disconnecting a phone line is detected and the system software removes the name of the corresponding internal modem from the available modem menu, and if necessary and possible, automatically selects an alternative modem as the currently active communication device.

It will be clear to one skilled in the art that connecting or disconnecting any device that forms part of a remote communication path, including but not limited to modems and network lines, could be detected and acted upon according to the present invention.

The system software provides a window which includes a modem menu and a location menu. This window can be invoked by the user when he desires to change communication parameter values. Also in some embodiments, this window is displayed automatically when the user inserts or removes a modem and when the user connects or disconnects an external modem or a phone line to his apparatus. From this menu, the user can simply confirm the system's assumption as to which communication device is to be used, or he can set up the modem and location, if needed, without changing to a different computer screen.

By displaying the menu with the newly installed communication device selected, the control mechanisms and user interfaces are easy to use both in the case where the system's assumption is correct and the newly connected device is to be used immediately and in the case where the user has something else in mind that the operating system doesn't know about. Similarly, when the selected device has been removed displaying the menu with an alternative device selected is convenient both in the case that the alternative device conforms to the user's intention and in the case where the user needs to alter the system's choice.

The system software allows the user to set up multiple "locations" from within which a network can be accessed, including locations for cellular telephone connections. When the user selects a current value for the location parameter, he implicitly selects one or more of the current area code, dial-out prefix, calling card or account number, phone number to dial, modem to use and communication initialization command, depending on what attributes the user has set up or defined for the particular location. Locations set up by the user may include his home, his office in a first city, his office in another city, and a "cellular" location.

The cellular location can include defining a special access number for a network access point capable of supporting cellular modem protocols. The user's intent to communicate in a special way, i.e., via wireless cellular connections, is recognized by the system, and in response, different phone numbers or communication initialization commands are substituted appropriately to provide an improved connection.

For example, the V.34 protocol can have problems in cellular communication. A modem initialization string of "AT, TMS=10, 1, 4800, 14400" forces the modem to use V.32bis, rather than the V.34 or V.22bis or other modulation that it may default to or negotiate. It also limits the speed range to between 4800 and 1440 baud.

These communication initialization parameter settings are not appropriate for land-line communication. They are not a function of which modem is selected or what application software is used. Rather, they are a function of the location the call is made from and the type of connection path that is available at that location. Associating such parameter settings with a location parameter makes the system intuitive and easy to use.

As another example of location-based parameters, consider a particular location, or network access point or communications mechanism that has a noisy or an expensive communication line. Advanced error correction or data compression techniques, such as link access protocol modems (LAPM), could be required for connections from that location. On the other hand, LAPM may be undesirable from other locations, such as those accessed from a cellular or an international line, where LAPM can actually reduce performance because of the noise characteristics of the line.

A location can be defined by the user to require or exclude whatever communication control parameters are appropriate to that location, including but not limited to: protocols, baud rates, data compression, and error control and correction. This is done by means of associating with each location that requires special handling a communication initialization command, including but not limited to a modem "init" string.

Hardware Configuration

FIG. 1 shows a small portable computing or info-tainment apparatus 100 that includes system software that supports modem switching functions. Apparatus 100 may include a touch sensitive display screen 110, which shows the user an alphanumeric and graphical display and which enables the user to provide input to the device by touching it.

Apparatus 100 may also include a telephone connector 120 connected to a modem internal to the apparatus. Apparatus 100 may also include a serial connector 130 which connects via a serial cable to an external device including but not limited to an external modem. Such modems allow the user to access remote services via a network, including but not limited to the telephone network.

Apparatus 100 may also include a card slot 140 for receiving a removable card, such as a modem or memory card. Card slot 140 may comply with the Personal Computer Memory Card International Association (PCMCIA) standard and thus accept any PCMCIA card.

In one embodiment, apparatus 100 is a Magic Link Model PIC-2000 Personal Intelligent Communicator manufactured by Sony Electronics, Inc. Nevertheless, it will be obvious to one skilled in the art that a wide range of apparatuses, including but not limited to computing or info-tainment apparatus 100, are suitable for practicing the present invention. Any apparatus could be employed that uses remote communication via a plurality of communication devices.

Figure 2:
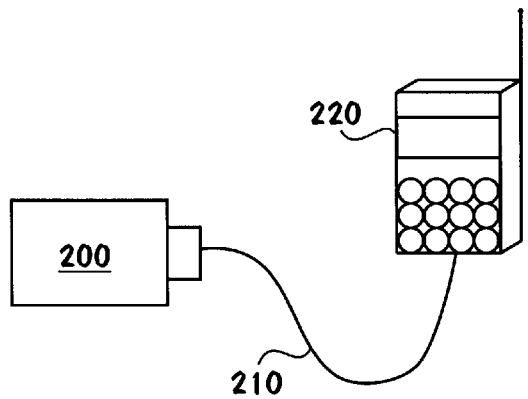
FIG. 2 shows a cellular phone connected to a modem card that is suitable for use with the computing device of the previous figure.

In FIG. 2, a modem card device 200 is connected to a cellular phone 220 using a cable 210. Modem card device 200 may include a CPU, a modem, RAM and ROM. When device 200 is inserted in slot 140 of apparatus 100, then apparatus 100 may control modem card 200.

Figure 3:
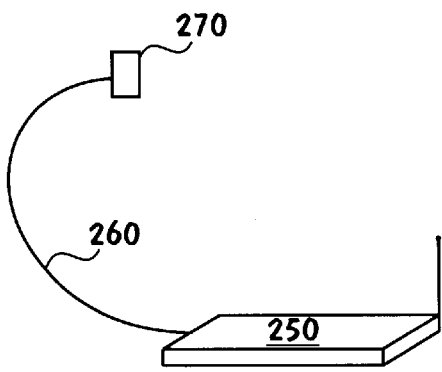
FIG. 3 shows an external wireless modem connected to a serial cable, suitable for connecting to a portable computing device.

In FIG. 3, an external wireless modem device 250 and a connector 270 are connected using a serial cable 260. External modem device 300 may include a CPU, wireless interface circuitry, RAM and ROM. When connector 270 is attached to connector 130 of apparatus 100, then apparatus 100 may control modem 250 by sending AT-type commands.

Figure 4:
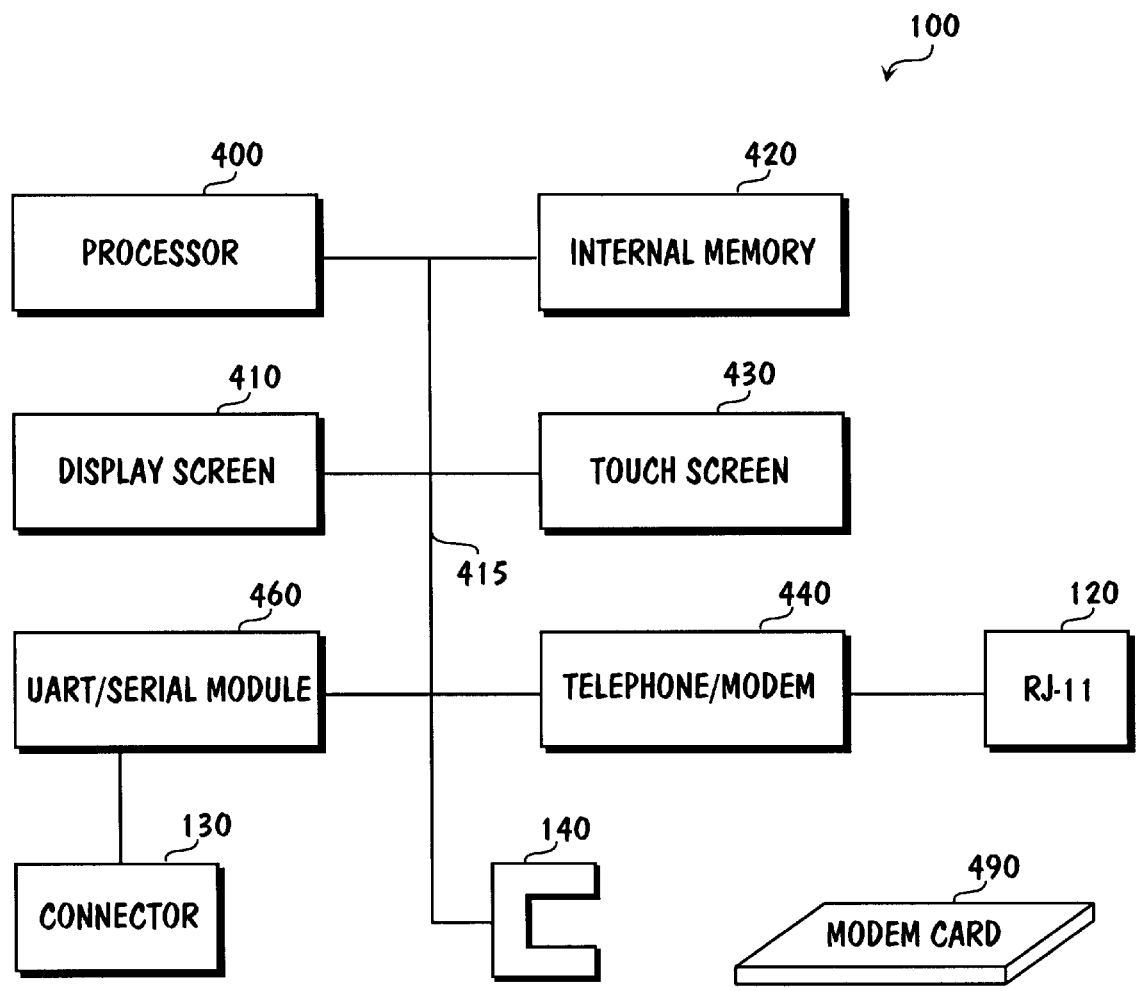
FIG. 4 shows the primary functional units within a portable computing device.

FIG. 4 shows a system level block diagram of one embodiment of apparatus 100. A processor 400 is connected via a bus 415, to an internal memory 420, to the display portion 410 of screen 110, to the touch portion 430 of screen 110, to a serial module or universal asynchronous receiver/ transmitter (UART) 460, to a telephone/modem block 440, and to card slot 140.

Serial module 460, connected to serial connector 130, may translate data from the processor to a serial data format and may send this data via connector 130. It also may translate serial data from an external device attached to connector 130 to a parallel format and notifies processor 400 when such data arrives.

Telephone/modem block 440 may connect to a standard RJ-II telephone connector 120. Alternatively, phone connector 120 can be replaced with another type of connector for any type of line into any suitable communication network. Processor 400 may control modem 440. Telephone/modem 440 may provide both standard telephone functions and modem communications functions.

Modem card 490 can be inserted into slot 140. Processor 400 may control modem 490 card via slot 140.

Processor 400 may directly detect a phone line insertion into or removal from phone jack 120, as well as a card insertion into, or removal from, slot 140. Alternatively, other circuitry within apparatus 100 can generate an interrupt for processor 400 when a phone line or card is inserted or removed.

The User Interface

Figure 5:
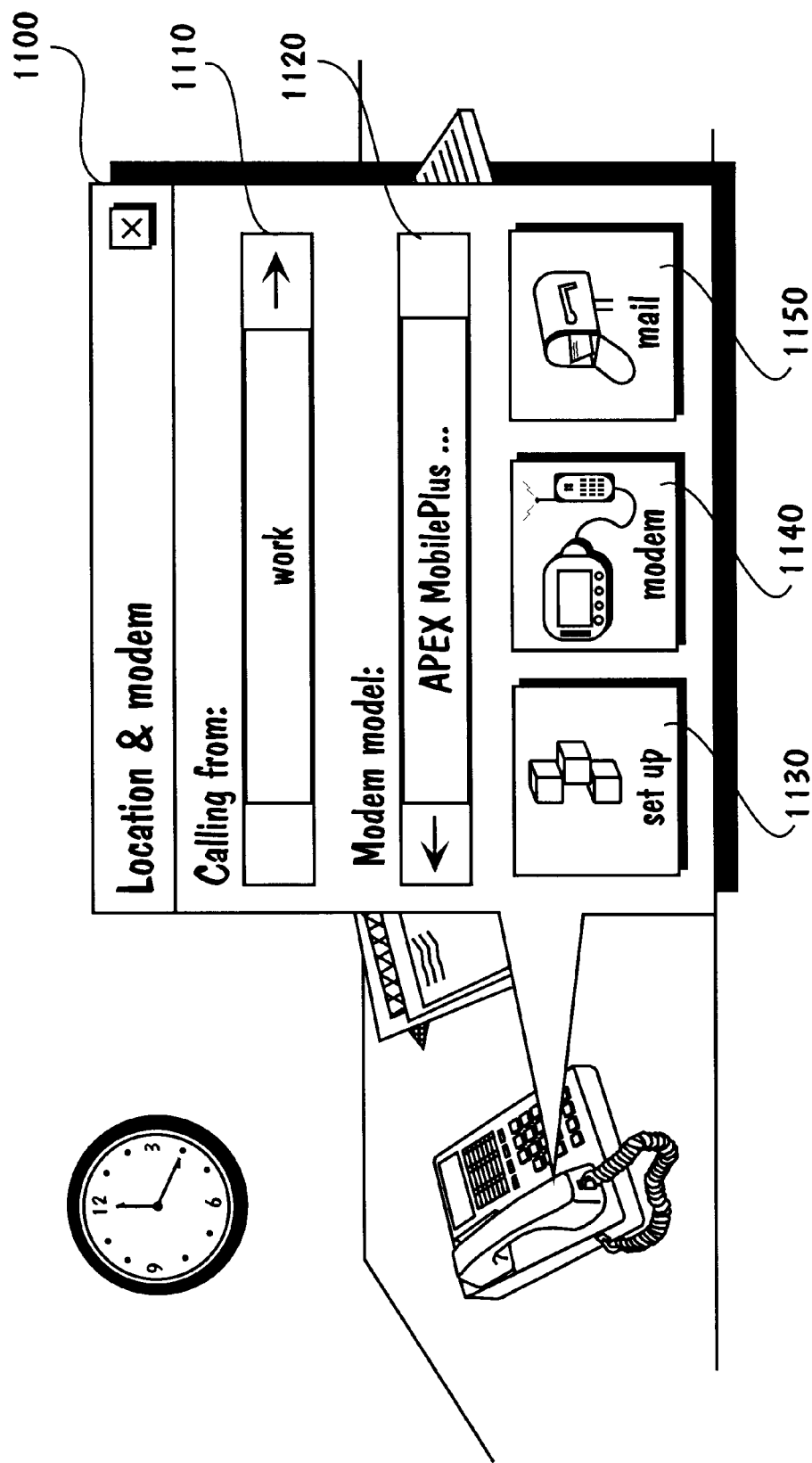
FIG. 5 shows a location and modem window according to the present invention.

FIG. 5 shows location and modem window 1100, which allows the user to select, or to confirm the system's automatic selection of, a current modem and a current location. Location and modem window 1100 includes a location choice box 1110, and a modem choice box 1120.

This window also includes a setup button 1130, that when selected displays a location setup screen. The location set up screen allows the user to define a new location or to select an existing location.

Figure 9:
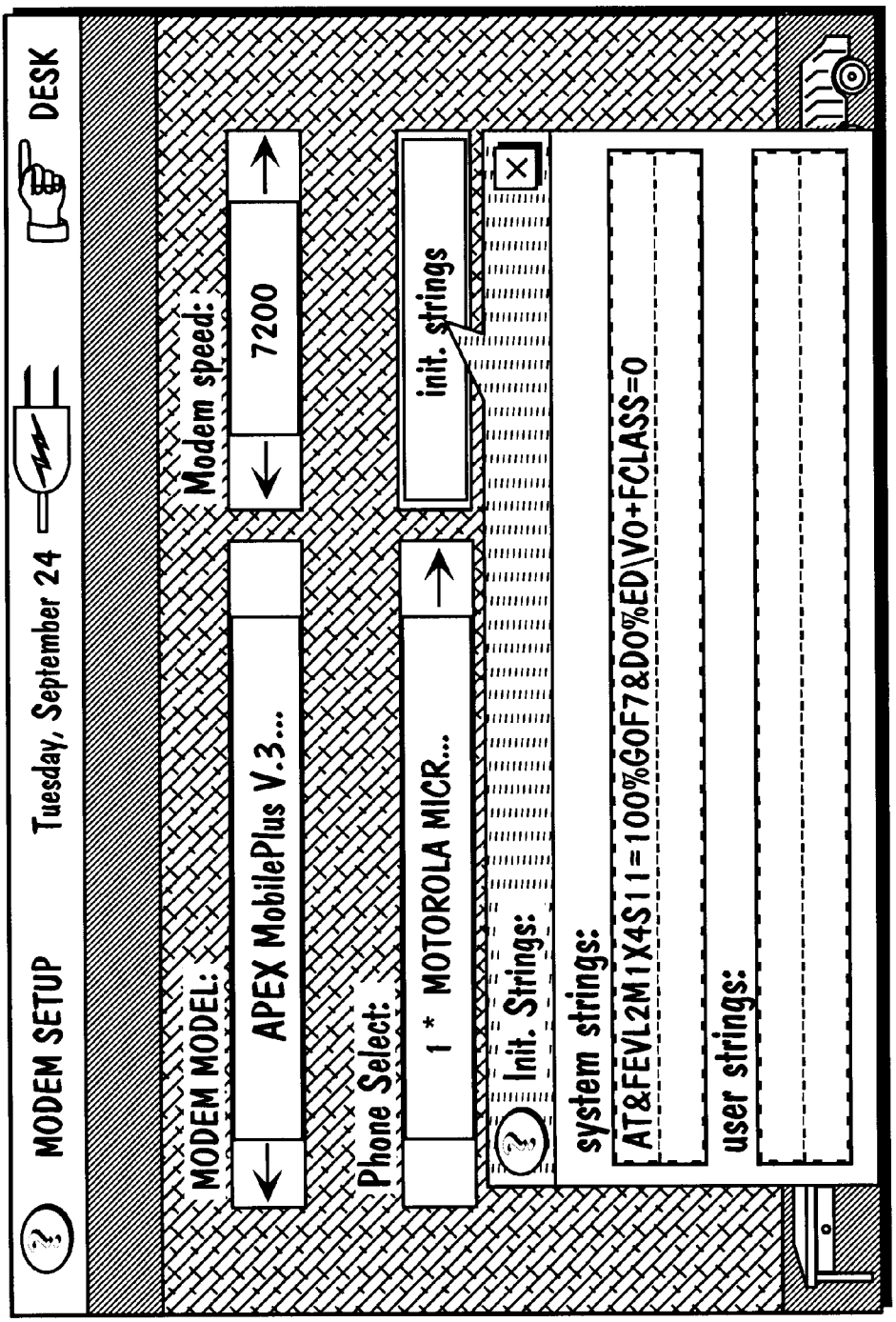
FIG. 9 shows a modem set up screen according to the present invention.

Location and modem window 1100 also includes a modem button 1140, that when selected displays a modem setup screen, as shown in FIG. 9. The modem set up screen allows a user to change the serial speed, the modem-to-modem speed, the cellular phone driver, and to add some specific AT commands into a modem initialization string. Location and modem window 1100 also includes a mail button 1150 that allows the user to access a communications service.

The user may access location and modem window 1100 by touching the telephone on the desktop screen. This user interface makes it easy for the user to control the remote communications that occur within any application program that uses the system interface for remote communications.

In one embodiment, the system software automatically displays location and modem window 1100 when the user inserts a modem card or otherwise connects a communication device. The system software assumes that the user is going to use the newly connected communication device and selects it. Automatically displaying location and modem window 1100 allows the user to alter or simply confirm the location from which he will be calling, or to correct the system's assumption about which modem the user wants currently selected for use.

Figure 6:
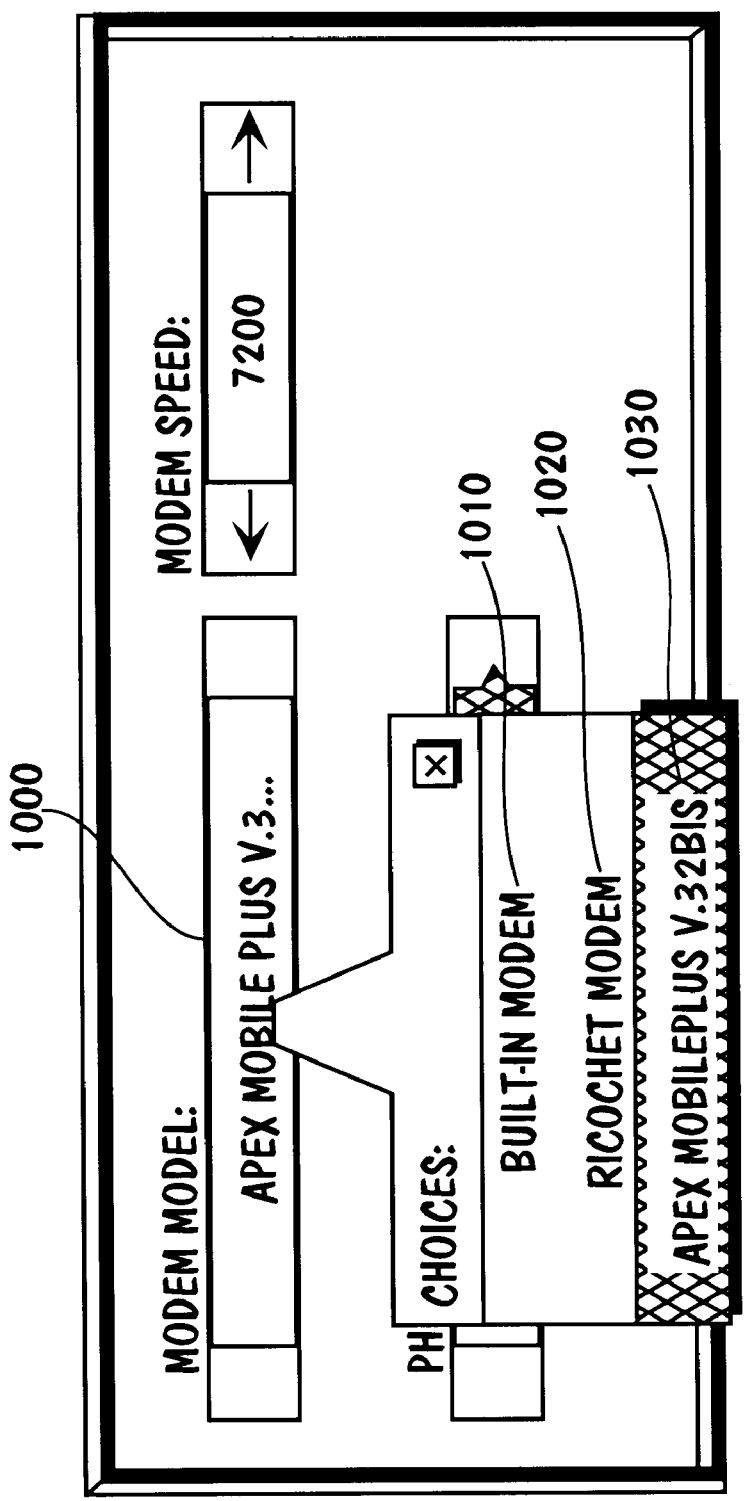
FIG. 6 shows the modem menu according to the present invention.

FIG. 6 shows the modem menu. A modem model selection choice box 1000 displays to the user the choices, which are taken from available modem profile list 720. In the example given in FIG. 6, these are: built-in modem 1010, Ricochet modem (an external modem) 1020, and APEX MobilePlus V.32bis modem 1030 (card modem).

When the user selects, using choice box 1000, the built-in modem, the system software sets the system modem indexical with the pointer to the system modem driver, and sets the system serial indexical with a pointer to the system serial driver. When the user selects the Ricochet external modem, the software sets the system modem indexical to a pointer to the external modem driver, and sets the system serial indexical with a pointer to the external serial driver. When user selects the APEX card modem, the software sets the system modem indexical with a pointer to the card modem driver, and sets system serial indexical with a pointer to the PCMCIA serial driver.

Thus, the user can change the current modem with one action which takes effect for all application software that uses the operating system interface for communications access.

In one embodiment, the system software automatically displays the modem menu of FIG. 6 when the user inserts a modem card or otherwise connects (or disconnects) a communication device. This assumes that the user is going to use the newly connected communication device (or a communication device that remains connected), but gives the user a convenient opportunity to alter or simply confirm this selection.

Figure 7:
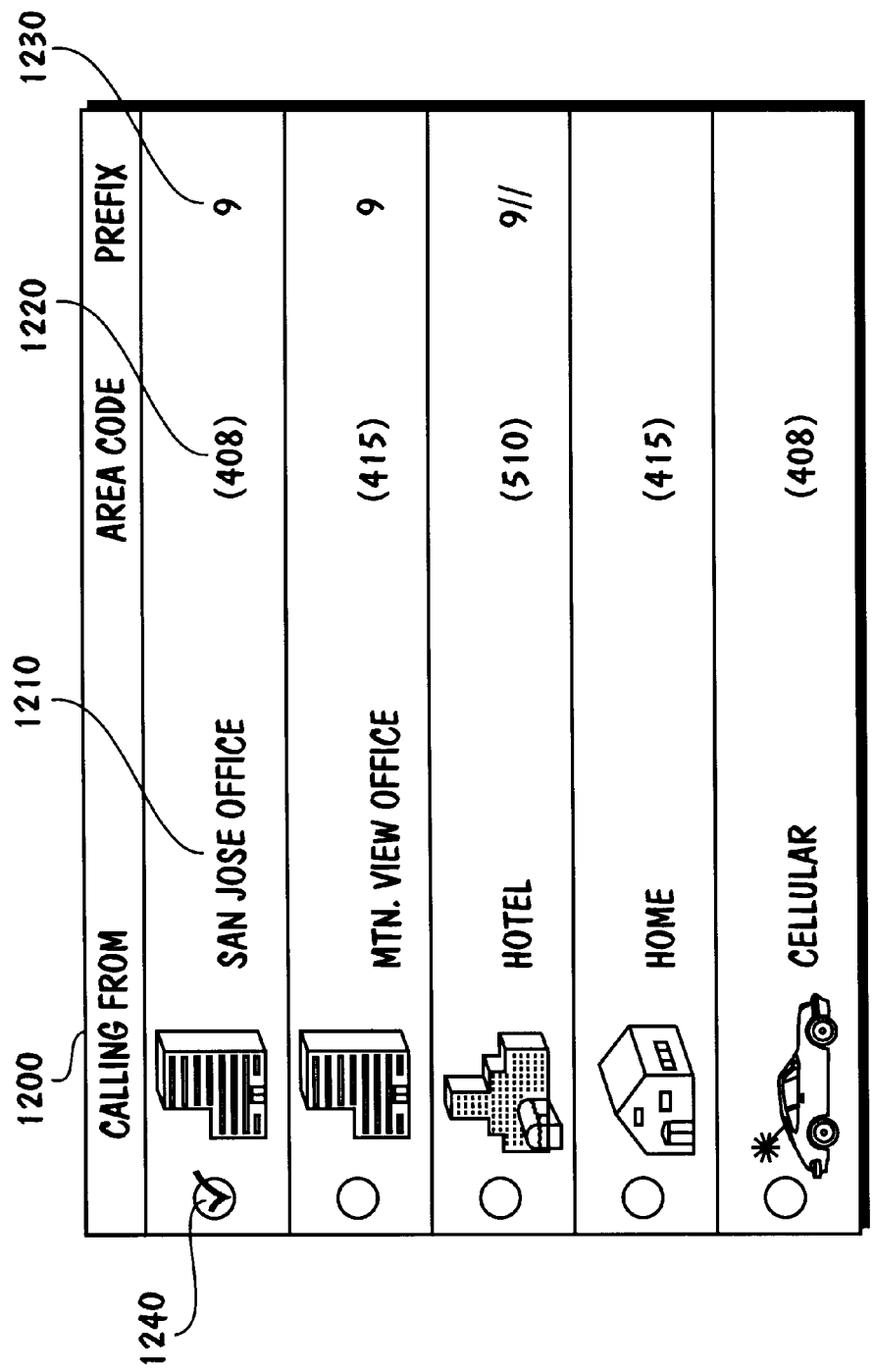
FIG. 7 shows a location list window according to the present invention, including a "cellular" location.

FIG. 7 shows a location list window 1200. The example window given in FIG. 7 includes five locations, one of which is selected. The location "San Jose Office" has its name 1210, its area code 1220 and its dial prefix 1230. For example, if the service access number is 408-555-1111, then the system dials 9, 555-1111. But if the user selects a different location like "Mountain. View Office," then the system dials 9,1-408-555-1111. Or if, the service access number is 800-555-111, the system dials 9, 1-800-555-1111. Thus, if the user has once selected or confirmed the current location before he starts accessing the service, the number dialed to access the service changes automatically.

In one embodiment, the system software automatically displays location list window 1200 when the user inserts a modem card or otherwise connects (or disconnects) a communication device. This assumes that the user is going to use the newly connected communication device (or a communication device that remains connected) and allows the user to enter the location from which he will be calling.

FIG. 7 also shows a location, named cellular, which has an area code 408. This location can have a pre-defined special access point number for cellular connections. The special access point number supports modems that use cellular protocols. So if the user accesses the communications service over a cellular phone, then the special access number should be dialed instead of the normal access number. The cellular location can also have a special modem initialization string defined such that the baud rate and protocol used are restricted to those appropriate for cellular connections.

Figure 8:
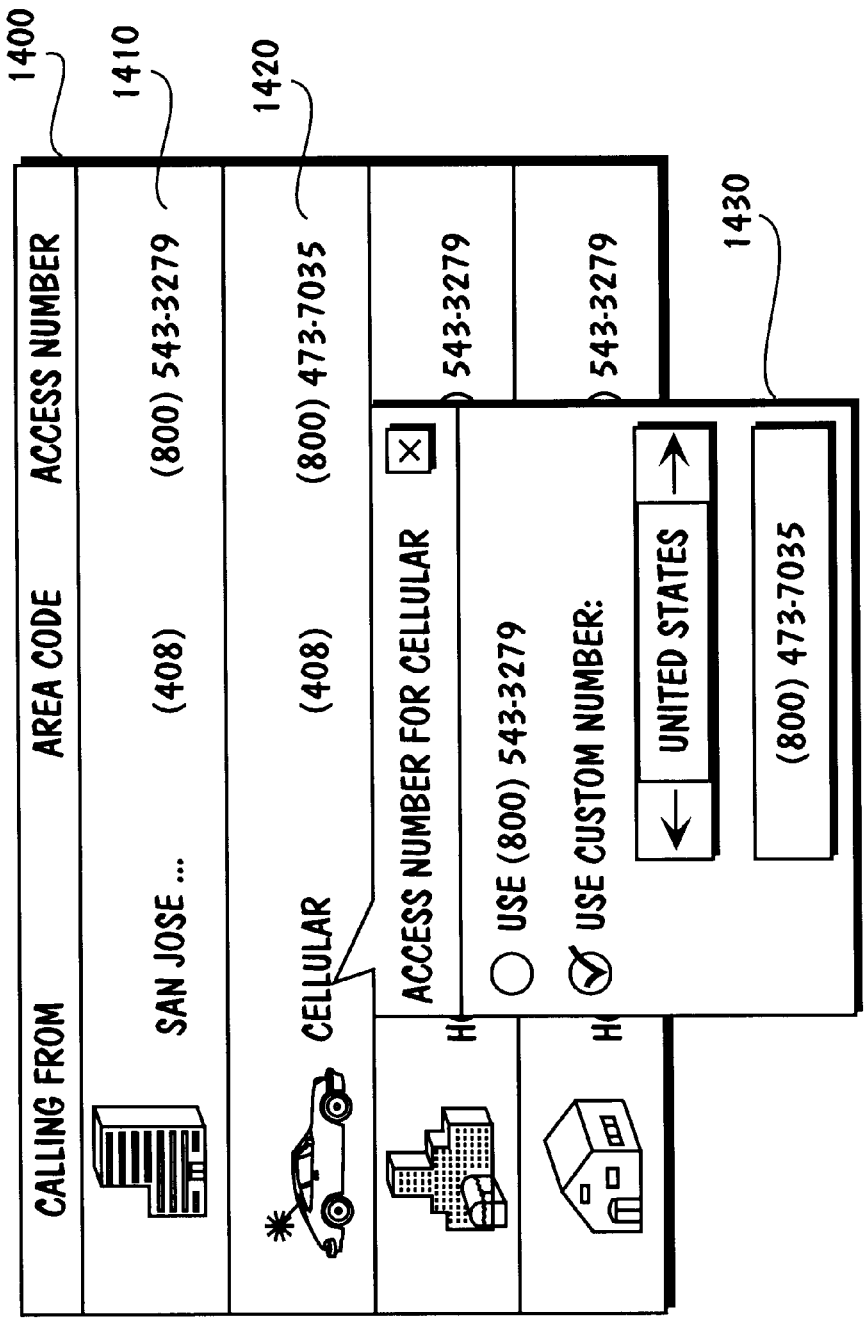
FIG. 8 shows a menu according to the present invention for defining a special access phone number for a particular location.

The screen shown in FIG. 8 allows the user to define special access phone numbers for each location. The phone number 1410 is the normal access number for land line connections. The number 1410 is automatically set up for use when a user selects the corresponding location, i.e. San Jose. The number 1420 is a special access number for a cellular connection. The number 1420 is automatically set up for use when a user selects the corresponding location, i.e. cellular.

The user may open window 1430, by means of which the special cellular or other location phone number may be defined, by selecting one entry in the list of locations shown in FIG. 8. The standard number and any specially entered numbers do not overwrite each other. Rather, they are retained in a list of custom numbers which the user can scroll thorough by means of the left and right arrows within window 1430.

Similarly, the user may select a modem for each location. The user may select one of the locations in the list as shown in FIG. 8, open window 1430 and request that a modem choice box (not shown) be displayed. The modem choice box is similar to the "Use custom number" choice box, except that it allows the user to select a modem rather than a phone number. After that one-time definition of what modem to use from a particular location, whenever the user changes to that location, the proper modem for it is automatically selected. Thus, the user often does not have to explicitly change the current modem before accessing a remote service or communication network.

The modem setup screen shown in FIG. 9 allows the user to define the serial speed, the modem-to-modem speed, and the cellular phone driver that apply to that location. Further, it allows the user to define special modem initialization strings for each location. For example, a cellular location could restrict the baud rate to be within a certain range, require or preclude certain protocols, data compression techniques or error correction techniques, etc. One way that the user may access the modem setup screen is to touch modem setup button 1140 in location and modem menu 1100, as shown in FIG. 5.

Figure 10:
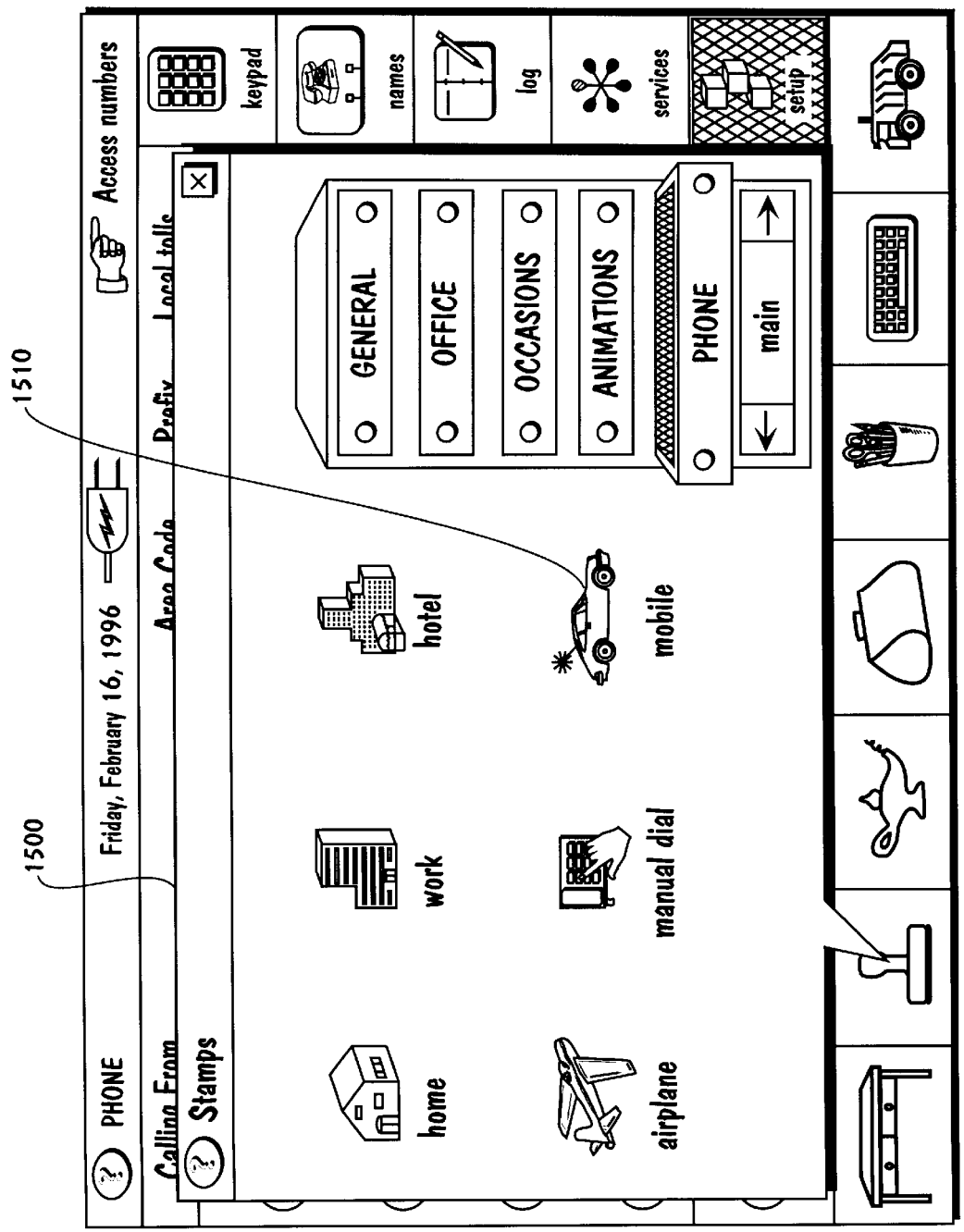
FIG. 10 shows a stamp window according to the present invention, which is a convenient method of selecting the current location from which remote communication will occur.

FIG. 10 displays a telephone stamps window 1500 which includes an icon or stamp for each location that has been defined. Telephone stamps window 1500 provides an alternative way in which the user may select the current location, i.e. by selecting the stamp that corresponds with the location which he will be communicating from. For example, a location stamp 1510, named "mobile" can correspond to the cellular location as discussed above. Thus, when the user selects the mobile icon, the properties defined for that location take effect—for example, the special access number is dialed without the user having to enter that number.

Operating System Configuration

Figures 11, 12:
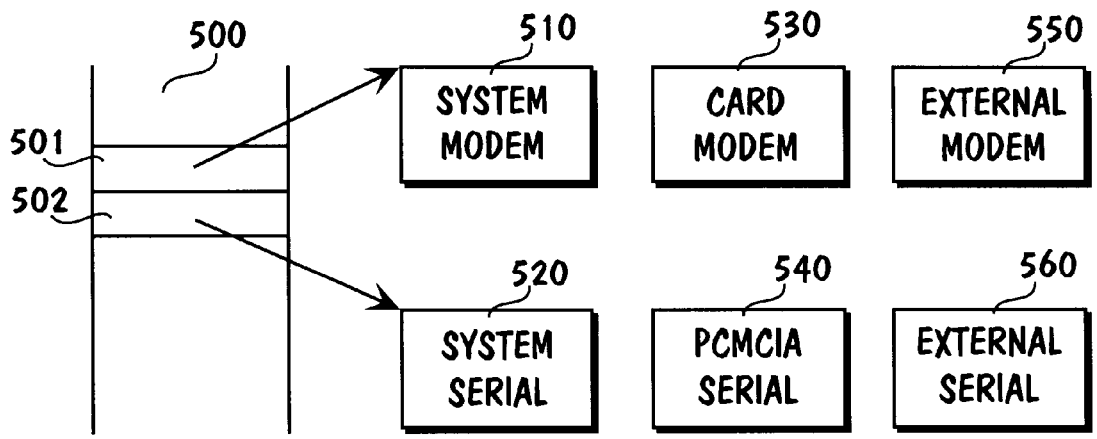
FIG. 11 shows a system object list according to the present invention.
FIG. 12 shows an interface between application software and the operating system or system software according to the present invention.

The system software or operating system includes a system object list 500, as shown in FIG. 11. System object list 500 includes pointers to important system objects. A location 501, named system modem indexical, stores a pointer to a modem object. System modem indexical points to system modem object 510 after apparatus 100 is initialized, e.g. at power on or at system reset. As will be described, what this pointer points to varies as different communication devices are selected.

A location 502, named system serial indexical, stores an indirect pointer to a serial object. It points to a system serial object 520 after apparatus 100 is first initialized. As will be described, what this pointer points to varies as different communication devices are selected.

The system modem driver provides an interface between application software and system software. This interface is illustrated in FIG. 12. The application software can issue commands to the currently selected system modem by means of calling the methods shown in FIG. 12, i.e. Open, Close, Read, Write, Disconnect, ConnectToNumber and Abort. Application software which uses the modem device refers to the system modem indexical when it calls the modem interface methods, thus invoking the driver for the currently selected system modem.

Likewise, the system serial driver has an application software interface similar to that described in FIG. 12, i.e. Open, Close, Read, Write, Disconnect, ConnectToNumber and Abort. Application software which uses the serial device refers to the system serial indexical when it calls the serial interface methods, thus invoking the driver for the currently selected serial device.

In fact, FIG. 12 describes the interface between the operating system and potentially all application programs for potentially all remote communication. Because of this standard interface, various driver programs for various modem card drivers 530 can be easily written and easily installed. Such drivers should have the same application software interface as the system modem driver, and should include functions to control a PCMCIA card modem. Also, various PCMCIA serial drivers 540 can be easily written and easily installed. Such drivers should have the same application software interface as the system serial driver, and should include functions to control whatever PCMCIA card is in slot 140.

The software can replace the system modem indexical with a pointer to the any new modem card driver and can replace the system serial indexical with a pointer to any new PCMCIA serial driver. Thus, the software can easily switch the data flow for the modem device from the system modem to the card modem and visa versa.

Similarly, a new external modem driver 550 can be created with the same application interface as the system modem driver and with functions to control the external modem. Also, a new external serial driver 560 can be created which has the same application interface as the system serial driver and which includes functions to control UART serial module 460.

The system software can then replace the system modem indexical with a pointer to the new external modem driver and can replace the system serial indexical with a pointer to the new external serial driver. Thus, the systems software can easily switch data flow for modem applications software between the external modem and the internal modem.

Figure 13:
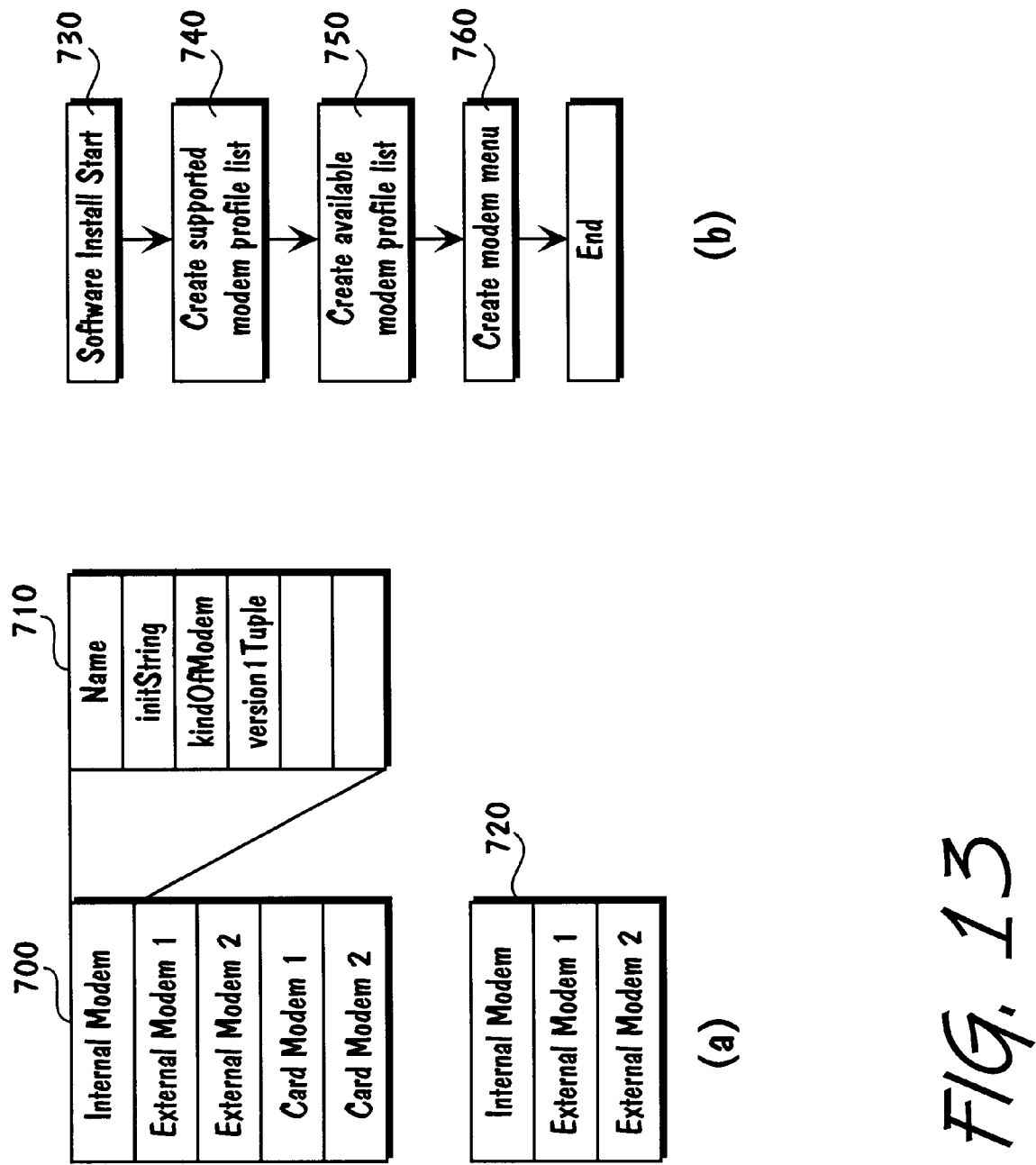
FIG. 13(a) shows two list data structures within the system software according to the present invention.
FIG. 13(b) shows the process flow involved when system software according to the present invention, initializes the lists shown in the previous figure.

FIG. 13(a) shows several tables which are used by the software and modem driver. Supported modem profile list 700 includes a modem profile for the internal modem, as well as modem profiles for all modems supported by the driver software. List 700, as shown in the example given in FIG. 13(a), includes modem profiles for an internal modem, two external modems and two card modems.

Each entry in the supported modem profile list has the same structure, i.e., modem profile 710. The modem driver software uses the modem profile to control the modem. Modem profile 710 includes the modem name, a "init" string to initialize the modem, a value representing the kind of modem (i.e., internal, external or card modem), and a string named version 1 tuple, which includes modem card's manufacture, model name, etc. If the modem is a card modem, then the tuple string in the profile is the same one as the string in the card information structure (CIS) of the modem card's memory.

Available modem profile list 720 is maintained by the system software as shown in FIG. 13(b). At step 730, the system software installs itself into internal memory 420. At step 740, the system software creates supported modem profile list 700, which is held in internal memory 420.

At step 750, the system software creates an available modem profile list, also held in internal memory 420, by selecting from supported modem profile list 700 those profiles for the internal modem and for any external modems currently connected to apparatus 100. Available modem profile list 720, as shown in the example given in FIG. 13(a), includes modem profiles for the internal modem and two external modems. At step 760, the software creates a modem menu from available modem profile list 720.

Figure 14:
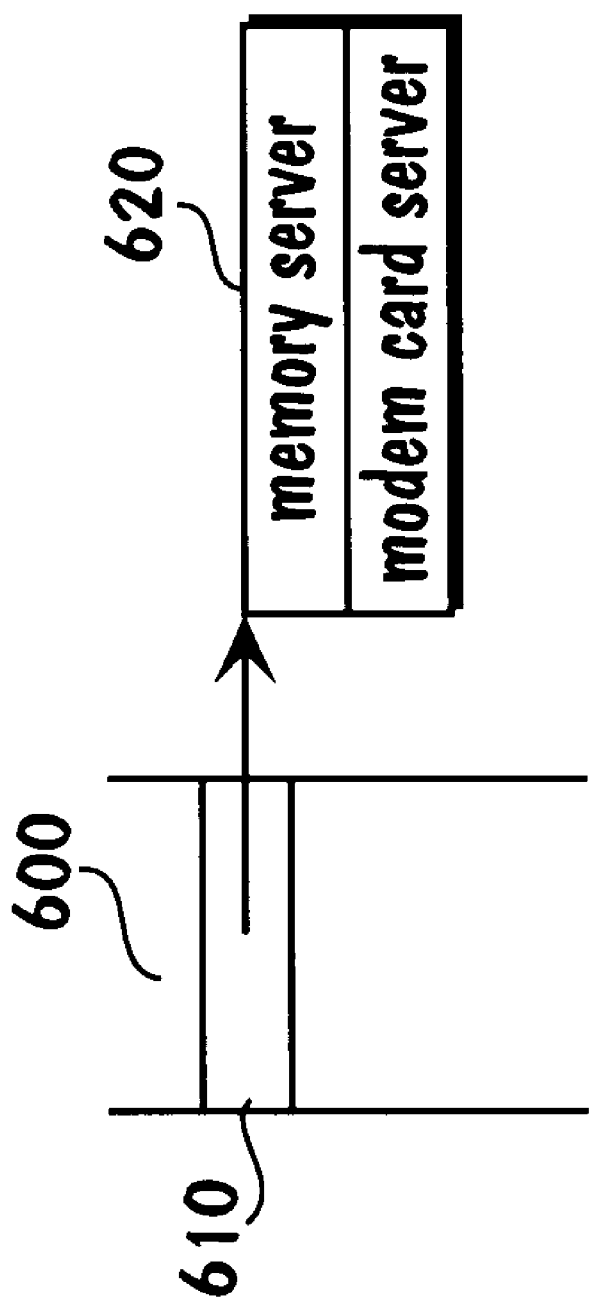
FIG. 14 shows the data structure according to the present invention that system software uses to support both memory cards and modem cards.

As shown in FIG. 14, the system software includes a system object list 600, which contains pointers to various system objects, including a pointer 610 to a list 620, named CardServerList, which is held in the system RAM portion of internal memory 420. The system software uses CardServerList 620 in order to determine the correct card server for a newly inserted card. After the system software has initialized CardServerList 620 when apparatus 100 is first powered on or reset, CardServerList 620 includes the class number of the MemoryServer and the ModemCardServer classes The system software defines a MemoryServer class for supporting RAM and ROM cards. System software adds the class number of the MemoryServer class to CardServerList 620. The system software also defines a ModemCardServer class for supporting modem cards. System software also adds the class number of the ModemCardServer class to CardServerList 620.

Adding and Removing a Modem Card

Figure 15:
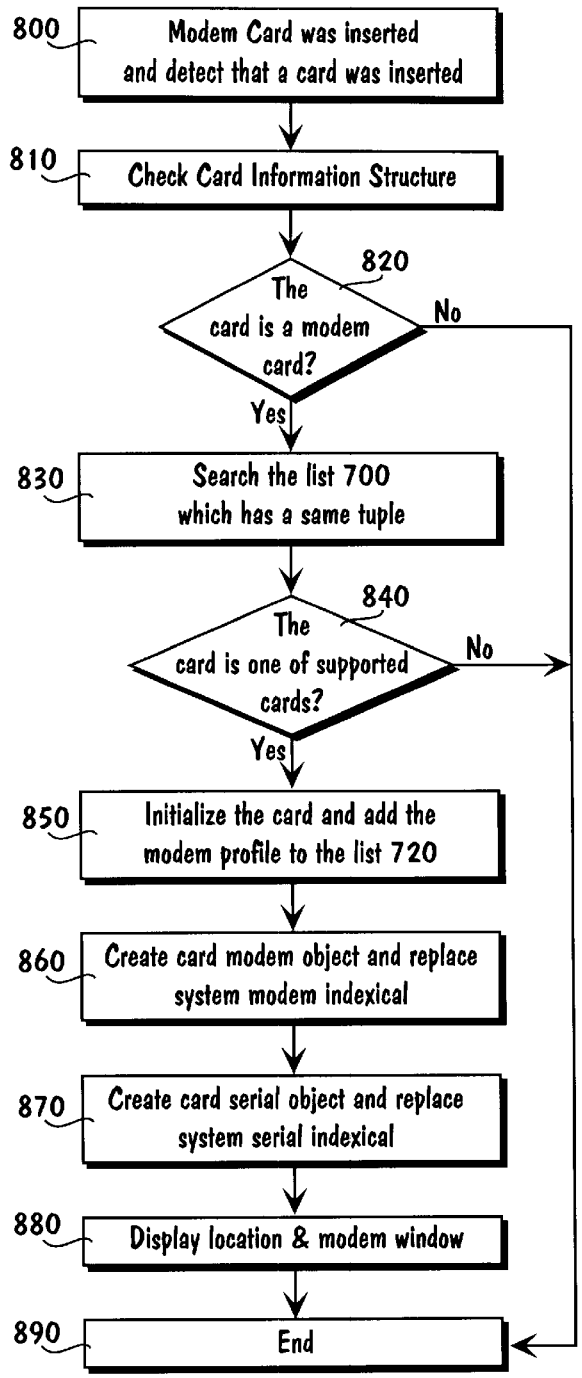
FIG. 15 shows the process flow according to the present invention, when a modem card is inserted into the portable computing device.

FIG. 15 shows a flow chart of the system software that is invoked when the user inserts a modem card. At step 800, the apparatus hardware detects that an add-in card has been inserted into slot 140 and notifies the system software. At step 810, the system software checks the CIS of the card to determine whether the card is a modem card or not. At step 820, if the card is a modem card, control passes to step 830. If not, control passes to step 890.

At step 830, the software compares the version 1 tuple of the card against the tuple string of all the modem profiles in the supported modem profile list. At step 840, control passes to step 850 if there is a modem profile which has the same version 1 string as the modem card in slot. If not, control passes to step 890.

At step 850, the software initializes the modem card and adds the modem profile to the available modem profile list. At step 860, the system software creates a modem card driver object and replaces the system modem indexical with a pointer to this modem card driver. At step 870, the software creates a PCMCIA serial driver object and replaces the system serial indexical with a pointer to the PCMCIA serial driver. At step 880, the software displays a "location and modem" window on the apparatus 100. At step 890, the modem driver selection process ends.

Thus, when the user inserts a modem card slot 140, the system software automatically switches the data flow of all modem applications to the card modem.

Figure 16:
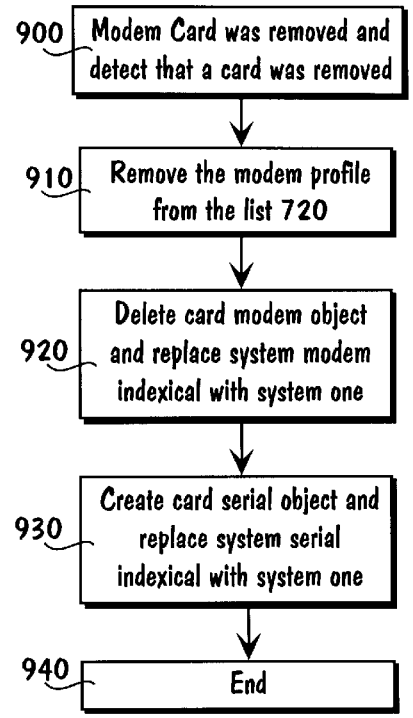
FIG. 16 shows the process flow according to the present invention, when a modem card is removed from the portable computing device.

FIG. 16 is a flow chart of the process that occurs when the user removes a card modem. At step 900, the hardware of apparatus 100 detects that an add-in card has been removed from the slot and notifies the system software. At step 910, the system software removes the modem profile of the card modem from the available modem profile list. Thus, the next time the modem menu is displayed, the name of the card modem is not displayed. At step 920, the software deletes the modem card driver object for the removed modem card and replaces the system modem indexical with a pointer to the system modem driver.

At step 930, the software deletes the PCMCIA serial driver object and replaces the system serial indexical with a pointer to the system serial driver. At step 940, the modem card removal process terminates.

Thus, when the user removes a modem card from the slot, the software automatically switches the data flow of modem applications to the system modem.

Similarly, when the user connects a phone line to the apparatus, the system detects it and notifies the software. The software executes steps 920 and 930. Therefore, when a user connects a phone line to the apparatus, the software automatically selects the system modem.

Figure 17:
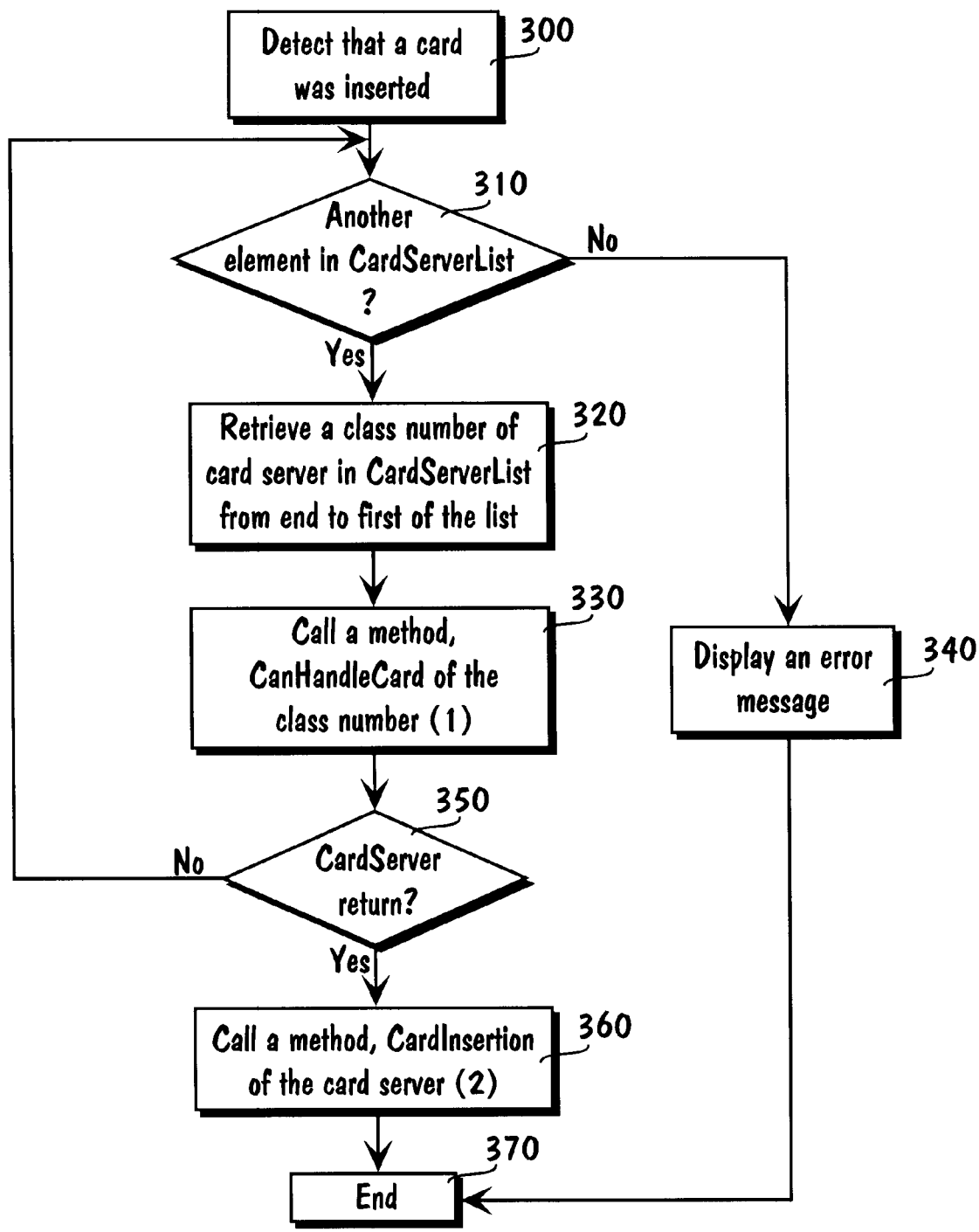
FIG. 17 shows the software process flow that occurs when a add-in card is inserted into the portable computing device.

FIG. 17 is a more detailed flow chart for the card recognition procedure that the system software goes through when the user inserts add-in card 130 into slot 120. It corresponds to the first several steps of FIG. 15. At step 310, the system determines whether CardServerList 290 has another element remaining to be checked. If there is no element left in the list, then control goes to step 340 and the system displays an error message that tells the user that the system software can't support the card that was inserted.

If there is a list element left to be checked, then the system software retrieves from that list element the class number of a card server (at step 320). At step 330, the system calls the CanHandleCard method within that class number. If the inserted card is supported, the CanHandleCard method creates a card server object for the card and returns it. The CanHandleCard method returns an error if the inserted card can is not supported.

At step 350, the system checks the return code from the CanHandleCard method. If an error is returned, then control goes to step 310 (above) where the system again checks to see if there is an another class number of a card server left to be checked.

If the CanHandleCard method returns a card server for the inserted card, then at step 330, the system calls a method of the card server, named Cardinsertion, which initializes or configures the card (step 360). At step 370, the card recognition procedure terminates.

Figures 18, 19:
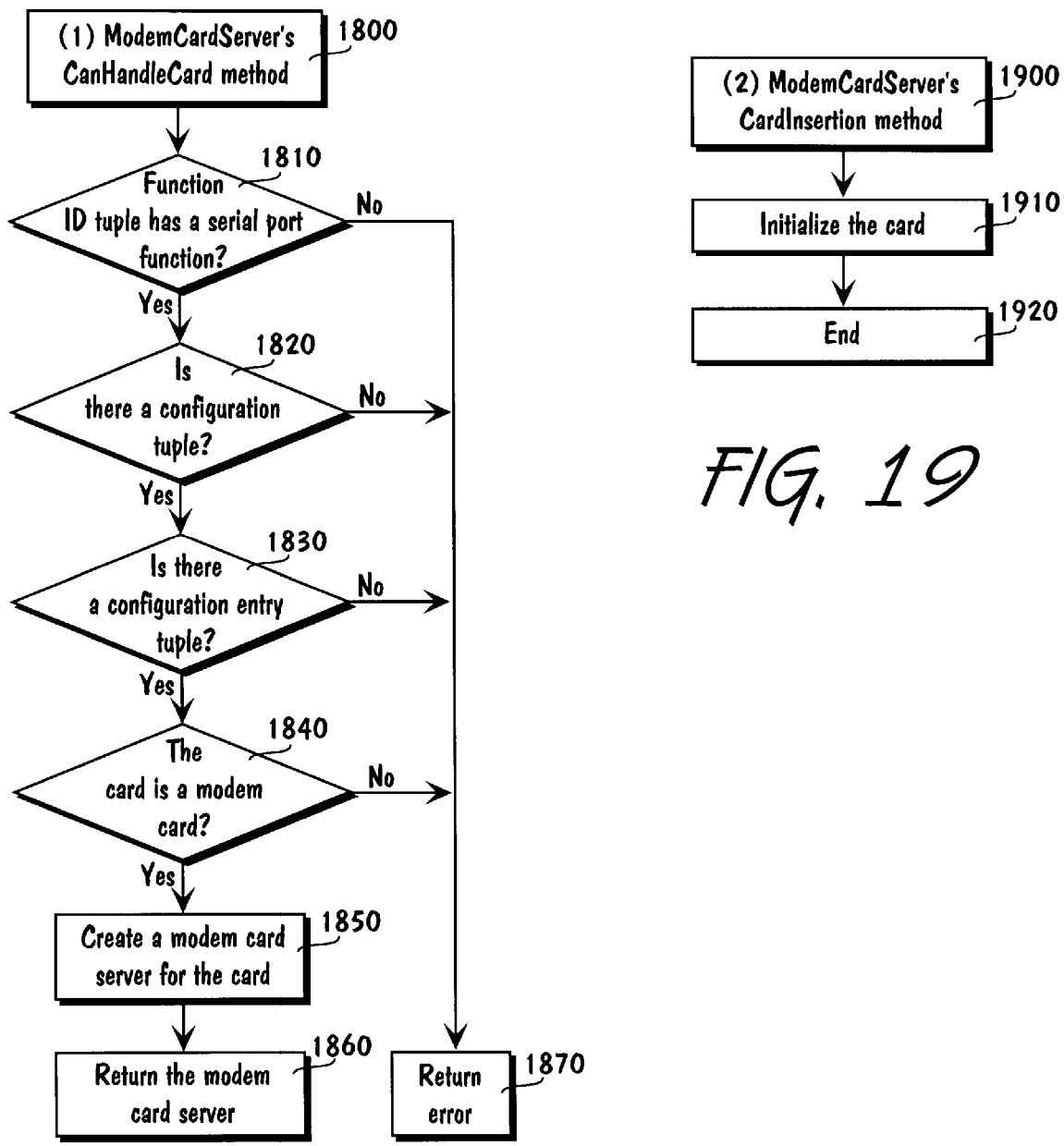
FIG. 18 shows the software process flow according to the present invention that occurs when the newly inserted card is recognized and matched with the modem card server object that supports it.
FIG. 19 shows the software process flow according to the present invention that occurs when the recognized modem card is configured for use in the portable computing device.

FIG. 18 is a flow chart of the process when the user inserts a modem card into the device which already has the software installed in the internal memory. As was discussed earlier in conjunction with FIG. 7, the system detects the inserted card (step 300). At step 310, as there is a class number of the ModemCardServer class in the CardServerList, control goes to step 320. At step 320, system software retrieves a class number of the ModemCardServer class. At step 330, system software calls CanHandleCard of the ModemCardServer class (i.e. step 1800 of FIG. 18).

At step 1810, control passes to step 1820 because the modem card has a function ID tuple which shows a serial server function. At step 1820 control passes to step 1830, because the modem card has a continuation tuple. At step 1830, control passes to step 1840, because the modem card has a configuration entry tuple. At step 1840, control passes to step 1850 because the configuration entry tuple of the card has information which indicates the card is a modem card. If the card inserted is not a modem card or is not recognized as being on the list of supported modems, then control passed to error return 1870.

At step 1850, system software creates a ModemCard-Server object for the modem card. At step 1850, the software returns the object and control returns to step 350 of FIG. 17. At step 350, control passes to step 360 because the Can-HandleCard method returned a ModemCardServer object.

At step 360, system software calls CardInsertion method of the ModemCardServer class; that is control passes to step 900 of FIG. 19.

FIG. 19 is a flow chart of the Cardinsertion method. The method is called at step 1900. In step 1910, the system software initializes the card hardware in order to set it up to read data from and to write data to the card. At step 1920, the CardInsertion method terminates and control returns to the card insertion process of FIG. 17. At step 370, the card insertion process terminates.

FIG. 20(*a*) shows a attribute typical memory dump list of a typical modem card. There are some tuples in the dump list which are defined by the PCMCIA standard. Additionally, the card has particular tuples that are defined by the system software.

FIG. 20(*b*) shows a function ID tuple from the dump list. The tuple has size byte, card function byte, and system initialization information bytes for initializing the card.

FIG. 20(c) shows a configuration tuple from the dump list. The tuple has size byte and some information for registers for initializing the card.

FIG. 20(d) shows a part of the configuration entry tuple from the dump list. The tuple has size byte and some table information for the card.

Conclusion

As illustrated herein, the present invention provides a novel and advantageous user interface for modem and communications path selection. One skilled in the art will realize that alternative embodiments, design alternatives and various changes in form and detail may be employed while practicing the invention without departing from its principles, spirit or scope. In particular, system configurations, windows, menus and flow charts shown herein may be simplified, augmented or changed in various embodiments of the invention.

The following claims indicate the scope of the present invention. Any variation which comes within the meaning of, or the range of equivalency of, any of these claims is within the scope of the present invention.

What is claimed is:

1. A method of selecting among communication devices for use with a programmable apparatus, comprising the apparatus performing the steps of:

detecting a transition in a physical connection between a communication device and the apparatus;

when the transition connects the communication device and the apparatus, then selecting the communication device;

when the transition disconnects the communication device and the apparatus, then deselecting the communication device;

wherein application software that executes on the apparatus and that uses an operating system interface to a communication network accesses the network via the selected communication device; and wherein the network is selected from a group consisting of the public switched telephone network (PSTN), a cellular telephone connection, a private telephone network, an integrated systems digital network (ISDN), an adaptive differential subscriber line (ADSL), a frame relay network, an asynchronous transfer mode (ATM) network, a personal communications services (PCS) network, an IRIDIUM network and a TELEDESIC network.

2. A portable user apparatus for use with a plurality of communication devices, comprising:

a circuit that detects a transition in a physical connection between one of the plurality of communication devices and the apparatus, the circuit generating, in response to the transition, a signal identifying the communication device and whether the transition connected or disconnected the identified device and the apparatus; and a processor that executes an application program under the control of an operating system;

wherein the operating system provides to the application program an interface for accessing a communication network via a communication device selected by a user from the plurality of communication devices, the operating system in response to the connect signal selecting the identified device and deselecting any previously selected device, and the operating system in response to the disconnect signal deselecting the identified device, wherein the network is selected from the group consisting essentially of the public switched telephone network (PSTN), a cellular telephone connection, a private telephone network, an integrated systems digital network (ISDN), an adaptive differential subscriber line (ADSL), a frame relay network, an asynchronous transfer mode (ATM) network, a personal communications services (PCS) network, an IRIDIUM network and a TELEDESIC network.

3. A method of setting up a communication device for use with a apparatus, comprising the computer-implemented steps of:

displaying to a user of the apparatus a menu that includes a location parameter whose value is selected from a plurality of locations, each location corresponding to an area within which the apparatus may be coupled to a communication network;

accepting from the user a confirmation of the current location value; and selecting, based on location value, a communication initialization command that controls communication over the network, wherein the communication network is selected from the group consisting of the public switched telephone network (PSTN), a cellular telephone connection, a private telephone network, an integrated systems digital network (ISDN), an adaptive differential subscriber line (ADSL), a frame relay network, an asynchronous transfer mode (ATM) network, a personal communications services (PCS) network, an IRIDIUM network and a TELEDESIC network.

* * * * *

UNITED STATES PATENT AND TRADEMARK OFFICE
CERTIFICATE OF CORRECTION

PATENT NO. : 5,961,608
DATED : October 5, 1999
INVENTOR(S) : Onosaka et al.

It is certified that error appears in the above-identified patent and that said Letters Patent is hereby corrected as shown below:

In column 3 at line 63 delete "invention," and insert --invention--

In column 4 at line 2 delete "invention," and insert --invention--

In column 12 at line 14 delete "can"

Signed and Sealed this

Twenty-seventh Day of March, 2001

Attest:

NICHOLAS P. GODICI

Attesting Officer

Acting Director of the United States Patent and Trademark Office